US012658686B2

(12) United States Patent
Bai et al.

(10) Patent No.: US 12,658,686 B2
(45) Date of Patent: Jun. 16, 2026

(54) POWER DISTRIBUTION PROTECTION SYSTEM AND METHOD THEREOF

(71) Applicant: Schneider Electric (China) Co., Ltd., Beijing (CN)

(72) Inventors: Heng Bai, Shanghai (CN); Jungang Xu, Shanghai (CN); Jiamin Chen, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 132 days.

(21) Appl. No.: 18/521,729

(22) Filed: Nov. 28, 2023

(65) Prior Publication Data

US 2025/0149873 A1     May 8, 2025

(30) Foreign Application Priority Data

Nov. 7, 2023     (CN) .......................... 202311471195.3

(51) Int. Cl.
H02H 3/10           (2006.01)
H02H 1/00           (2006.01)
          (Continued)

(52) U.S. Cl.
CPC ............ H02H 1/0007 (2013.01); H02H 3/10 (2013.01); H02H 7/266 (2013.01); H02J 9/062 (2013.01)

(58) Field of Classification Search
CPC ........ H02H 1/0007; H02H 3/10; H02H 7/266; H02J 9/062
See application file for complete search history.

(56) References Cited

U.S. PATENT DOCUMENTS 11,348,752 B2     5/2022   Telefus et al.
11,777,301 B2 *  10/2023   Lichauer ................. H02H 3/08
                                                    361/2
          (Continued)

FOREIGN PATENT DOCUMENTS

DE        102021210833 A1     3/2023
WO          20160105551 A1     6/2016

OTHER PUBLICATIONS

Extended European Search Report dated Jun. 18, 2024 for corresponding European Patent Application No. 23212770.4-1001, 9 pages.

*Primary Examiner* — Scott Bauer
(74) *Attorney, Agent, or Firm* — Wolf, Greenfield & Sacks, P.C.

(57)          ABSTRACT
The disclosure relates to a power distribution protection system and a method thereof. The system includes: a main input unit configured to receive an alternating current power input; a electronic switch; a isolating switch; a main output unit configured to output alternating current power; a main-circuit automatic detection unit configured to detect a parameter of output from the electronic switch in a disconnection state of the isolating switch; a main control unit configured to determine whether a state of the electronic switch is normal based on electrical parameter information detected by the main-circuit automatic detection unit; the main input unit, the electronic switch, the isolating switch and the main output unit are connected in series. When the state of the electronic switch is normal, the isolating switch is closed, and then the electronic switch is turned on. When the state of the electronic switch is abnormal, the isolating switch remains disconnected.

20 Claims, 6 Drawing Sheets

(51) Int. Cl.
 H02H 7/26 (2006.01)
 H02J 9/06 (2006.01)

(56) References Cited

U.S. PATENT DOCUMENTS

2006/0120000 A1* 6/2006 Fiesoli ................... H02H 3/087
  361/93.1
2014/0078622 A1* 3/2014 Crane ................. H01H 33/596
  361/8
2023/0318594 A1 10/2023 Zhang
2024/0395480 A1* 11/2024 Tannhäuser ............ H02H 3/021

\* cited by examiner

POWER DISTRIBUTION PROTECTION SYSTEM AND METHOD THEREOF

CROSS-REFERENCE TO RELATED APPLICATIONS

This patent claims priority under 35 U.S.C. § 119 to Chinese Patent Application No. 202311471195.3, filed on Nov. 7, 2023.

TECHNICAL FIELD

The present disclosure relates to a power distribution protection system and a method thereof, and in particular, to a protection system and a method thereof for power-up and disconnection processes of alternating current power distribution.

BACKGROUND

Alternating current power distribution input forms are diversified, e.g., application scenarios such as a wiring form of single-phase (any 2P) alternating current input, a wiring form of standard three-phase live-wire alternating current input, a wiring form of standard three-phase alternating current input with phase-lost, and a wiring form of double live wire+N wire alternating current input.

Meanwhile, with the development of the power electronic technology and the Internet-of-Things technology, it is required that branch protection of a power distribution system has not only the functions of overload, short-circuit, leakage current protection, and the like, but also the functions of failure state indication, remote communication, protection curve customization, and the like, and it is required that switching devices in the branch protection of the power distribution system are capable of responding on us-level time scale and disconnecting a broken-down branch.

Moreover, for the particularity of an alternating current power distribution system in, for example, data center application, a solid-state disconnecting power electronic switching device in the alternating current power distribution system needs to auto-detect its own functions (i.e., before a mechanical switch of the alternating current power distribution system is closed when powering up each time, or after overcurrent and short-circuit protection action anomalies are removed and before the mechanical switch is closed when powering up again, it needs to be guaranteed that the solid-state disconnecting power electronic switching device in the alternating current power distribution system is in a good state before a closing command action is performed), thereby preventing the case in which a main circuit from is closed in a failure state of the electronic switching device to result in failing to rapidly disconnect circuit power supply at a later stage, and hence a safety risk.

Therefore, in view of the above problem, there is an urgent need to provide a comprehensive and intelligent protection solution for power-up and disconnection processes of alternating current power distribution.

SUMMARY

According to one aspect of the present disclosure, there is provided a power distribution protection system, including: a main input unit configured to receive an alternating current power input; a main-circuit electronic switch unit connected in series to the main input unit; a controllable mechanical isolating switch connected in series to the main-circuit electronic switch unit; a main output unit connected in series to the controllable mechanical isolating switch and configured to output alternating current power; a main-circuit automatic detection unit configured to detect an electrical parameter of output from the main-circuit electronic switch unit in a disconnection state of the controllable mechanical isolating switch; a main control unit configured to determine whether a state of a main-circuit electronic switch of the main-circuit electronic switch unit is normal based on electrical parameter information detected by the main-circuit automatic detection unit; and an auxiliary power supply unit configured to provide working power supply for the main control unit and the main-circuit automatic detection unit based on the alternating current power input received by the main input unit, wherein when the state of the main-circuit electronic switch of the main-circuit electronic switch unit is normal, the controllable mechanical isolating switch is closed under the control of the main control unit, and then the main-circuit electronic switch of the main-circuit electronic switch unit is turned on; and when the state of the main-circuit electronic switch of the main-circuit electronic switch unit is abnormal, the controllable mechanical isolating switch remains disconnected under the control of the main control unit.

The power distribution protection system further includes: an input state detection unit configured to detect an electrical parameter of the alternating current power input received by the main input unit, wherein the main control unit is configured to: determine whether the alternating current power input is in a state of "abnormal alternating current power input in a particular wiring form" or in a state of "normal alternating current power input in a particular wiring form" based on electrical parameter information detected by the input state detection unit; and when the alternating current power input is in the state of "normal alternating current power input in a particular wiring form", further determine whether the state of the main-circuit electronic switch of the main-circuit electronic switch unit is normal based on the electrical parameter information detected by the main-circuit automatic detection unit; wherein the auxiliary power supply unit is further configured to provide working power supply for the input state detection unit based on the alternating current power input received by the main input unit; wherein when the alternating current power input is in the state of "abnormal alternating current power input in a particular wiring form", the main-circuit electronic switch of the main-circuit electronic switch unit is turned off, and the controllable mechanical isolating switch is disconnected under the control of the main control unit; and wherein when the alternating current power input is in the state of "normal alternating current power input in a particular wiring form" and when the state of the main-circuit electronic switch of the main-circuit electronic switch unit is normal, the controllable mechanical isolating switch is closed under the control of the main control unit, and then the main-circuit electronic switch of the main-circuit electronic switch unit is turned on.

The power distribution protection system further includes: a detection and driving unit configured to detect a current output by the main-circuit electronic switch unit in a state where the main-circuit electronic switch of the main-circuit electronic switch unit is turned on and the controllable mechanical isolating switch is closed, wherein the auxiliary power supply unit is configured to provide working power supply for the detection and driving unit; wherein the main control unit is configured to determine whether a main circuit is in an "overcurrent or overload or leakage current" state based on the current detected by the detection and driving unit; when the main circuit is determined to be in the "overcurrent or overload or leakage current" state, if the main control unit determines that an abnormal current detected by the detection and driving unit reaches an instantaneous tripping level, the main-circuit electronic switch of the main-circuit electronic switch unit is turned off by means of the detection and driving unit, and meanwhile, the main control unit controls the controllable mechanical isolating switch to be disconnected; when the main circuit is determined to be in the "overcurrent or overload or leakage current" state, if the main control unit determines that the abnormal current detected by the detection and driving unit does not reach the instantaneous tripping level, time is delayed by the main control unit; and if the main circuit is still in the "overcurrent or overload or leakage current" state when the delayed time expires, the main-circuit electronic switch of the main-circuit electronic switch unit is turned off by means of the detection and driving unit, and meanwhile, the main control unit controls the controllable mechanical isolating switch to be disconnected.

The power distribution protection system further includes: the input state detection unit being configured to detect a voltage of alternating current power received by the main input unit in the state where the main-circuit electronic switch of the main-circuit electronic switch unit is turned on and the controllable mechanical isolating switch is closed, wherein the main control unit is configured to determine whether the alternating current power is in an "overvoltage or undervoltage" state based on the voltage detected by the input state detection unit; and when the alternating current power is determined to be in the "overvoltage or undervoltage" state, the main-circuit electronic switch of the main-circuit electronic switch unit is turned off by means of the detection and driving unit, and meanwhile, the main control unit controls the controllable mechanical isolating switch to be disconnected.

The particular wiring form of alternating current power includes a wiring form of three-phase live-wire alternating current input, a wiring form of single-phase alternating current input, a wiring form of standard three-phase alternating current input with phase-lost, and a wiring form of double live wire+N wire alternating current input.

The electrical parameter information is at least one of a voltage amplitude, a frequency, and a phase.

The power distribution protection system further includes: an input overvoltage absorption unit configured to absorb residual energy of an upper-stage circuit after the main-circuit electronic switch of the main-circuit electronic switch unit is turned off or the controllable mechanical isolating switch is disconnected or to absorb input surge energy when the controllable mechanical isolating switch is closed; an output overvoltage absorption unit configured to absorb residual energy of a lower-stage circuit after the main-circuit electronic switch of the main-circuit electronic switch unit is turned off or the controllable mechanical isolating switch is disconnected or to absorb output surge energy when the controllable mechanical isolating switch is closed; and a communication and display unit configured to exchange electrical parameter and control information with the main control unit, input switching value information to the main control unit, and display failure information.

According to one aspect of the present disclosure, there is provided a method for a power distribution protection system, wherein the power distribution protection system includes a main-circuit electronic switch unit and a controllable mechanical isolating switch. The method includes: detecting an electrical parameter of output from the main-circuit electronic switch unit in a disconnection state of the controllable mechanical isolating switch; determining whether a state of a main-circuit electronic switch of the main-circuit electronic switch unit is normal based on electrical parameter information detected; when the state of the main-circuit electronic switch of the main-circuit electronic switch unit is normal, closing the controllable mechanical isolating switch, and then turning on the main-circuit electronic switch of the main-circuit electronic switch unit; and when the state of the main-circuit electronic switch of the main-circuit electronic switch unit is abnormal, allowing the controllable mechanical isolating switch to remain disconnected.

The method further includes: detecting an electrical parameter of the alternating current power input; determining whether the alternating current power input is in a state of "abnormal alternating current power input in a particular wiring form" or in a state of "normal alternating current power input in a particular wiring form" based on the detected electrical parameter information of the alternating current power input; and when the alternating current power input is in the state of "normal alternating current power input in a particular wiring form", further determining whether the state of the main-circuit electronic switch of the main-circuit electronic switch unit is normal based on the detected output electrical parameter information of the main-circuit electronic switch unit; when the alternating current power input is in the state of "abnormal alternating current power input in a particular wiring form", turning off the main-circuit electronic switch of the main-circuit electronic switch unit, and disconnecting the controllable mechanical isolating switch; and when the alternating current power input is in the state of "normal alternating current power input in a particular wiring form" and when the state of the main-circuit electronic switch of the main-circuit electronic switch unit is normal, closing the controllable mechanical isolating switch, and then turning on the main-circuit electronic switch of the main-circuit electronic switch unit.

The method further includes: detecting a current output by the main-circuit electronic switch unit in a state where the main-circuit electronic switch of the main-circuit electronic switch unit is turned on and the controllable mechanical isolating switch is closed; and determining whether a main circuit is in an "overcurrent or overload or leakage current" state based on the detected current output by the main-circuit electronic switch unit. When the main circuit is determined to be in the "overcurrent or overload or leakage current" state, if the detected abnormal current output by the main-circuit electronic switch unit is determined to reach an instantaneous tripping level, the main-circuit electronic switch of the main-circuit electronic switch unit is turned off, and meanwhile, the controllable mechanical isolating switch is controlled to be disconnected; and when the main circuit is determined to be in the "overcurrent or overload or leakage current" state, if the detected abnormal current output by the main-circuit electronic switch unit is determined to not reach the instantaneous tripping level, time is delayed; and if the main circuit is still in the "overcurrent or overload or leakage current" state when the delayed time expires, the main-circuit electronic switch of the main-circuit electronic switch unit (3) is turned off, and meanwhile, the controllable mechanical isolating switch is controlled to be disconnected.

The method further includes: detecting a voltage of alternating current power in a state where the main-circuit electronic switch of the main-circuit electronic switch unit is turned on and the controllable mechanical isolating switch is closed, wherein whether the alternating current power is in an "overvoltage or undervoltage" state is determined based on the voltage detected by the input state detection unit; and when the alternating current power is determined to be in the "overvoltage or undervoltage" state, turning off the main-circuit electronic switch of the main-circuit electronic switch unit, and meanwhile, controlling the controllable mechanical isolating switch to be disconnected.

The particular wiring form of alternating current power includes a wiring form of three-phase live-wire alternating current input, a wiring form of single-phase alternating current input, a wiring form of standard three-phase alternating current input with phase-lost, and a wiring form of double live wire+N wire alternating current input.

The electrical parameter information is at least one of a voltage amplitude, a frequency, and a phase.

The method further includes: absorbing residual energy of an upper-stage circuit after the main-circuit electronic switch of the main-circuit electronic switch unit is turned off or the controllable mechanical isolating switch is disconnected or absorbing input surge energy when the controllable mechanical isolating switch is closed; absorbing residual energy of a lower-stage circuit after the main-circuit electronic switch of the main-circuit electronic switch unit is turned off or the controllable mechanical isolating switch is disconnected or absorbing output surge energy when the controllable mechanical isolating switch is closed; and exchanging electrical parameter and control information and input switching value information, and displaying failure information.

The features and technical advantages of examples of the present disclosure have been summarized considerably broadly to provide a better understanding of the following detailed description. Other features and advantages will be described below. The disclosed concepts and specific examples may be readily used as modifications or designs as foundations of other structures for implementing the same objective of the present disclosure. Such equivalent configurations do not depart from the scope of the appended claims. When the following description is considered with reference to the accompanying drawings, the features of the concepts disclosed herein, and both of the organization and operation methods and associated advantages will be better understood. Each drawing is provided for the purpose of illustration and description rather than serving as definitions to limit the claims.

BRIEF DESCRIPTION OF THE DRAWINGS

The aspects, features, and advantages of the present disclosure will become clearer and easily understandable from the following description of the embodiments with reference to the accompanying drawings, in which.

6

Figure 4:
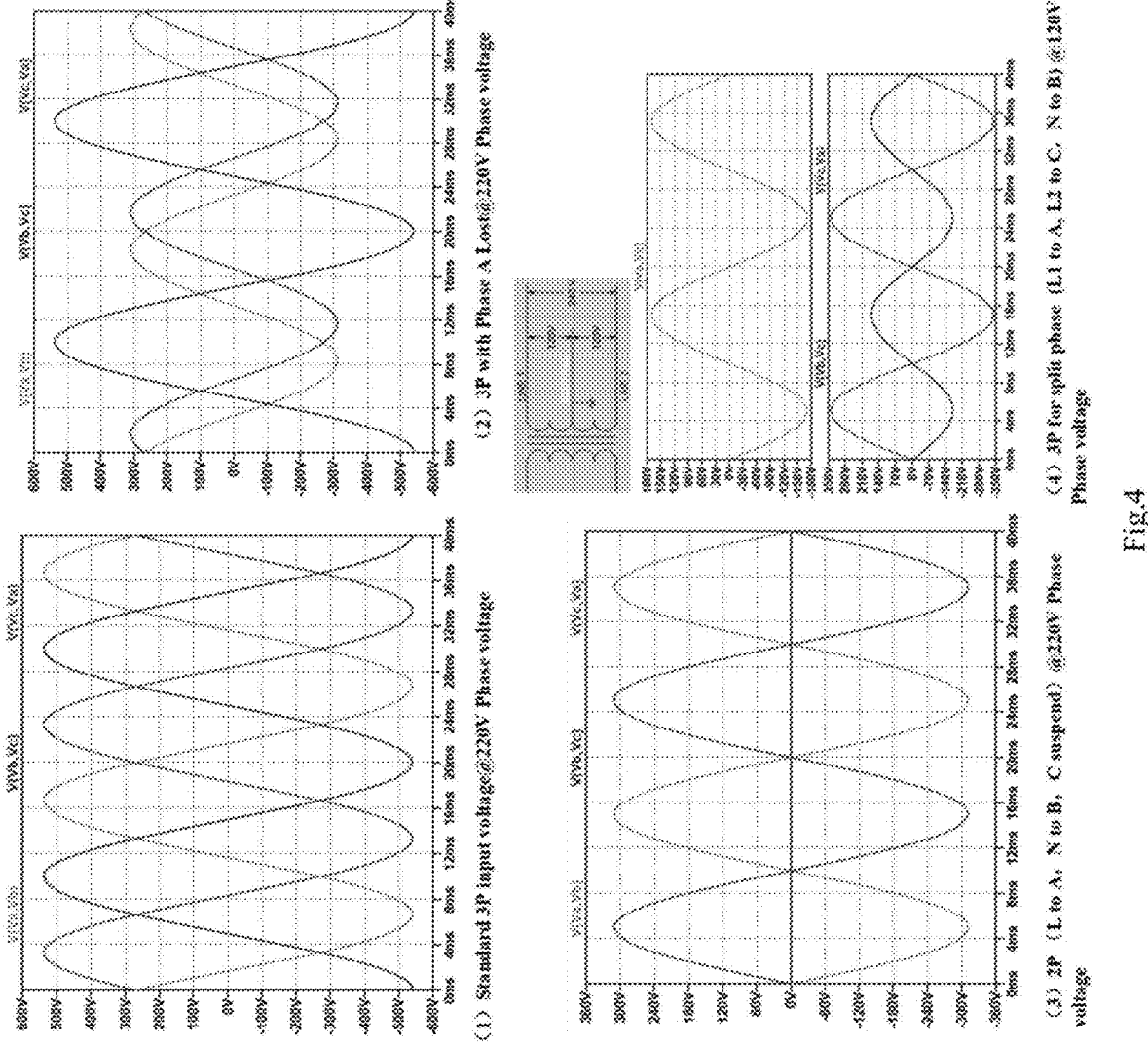
Figure 5:
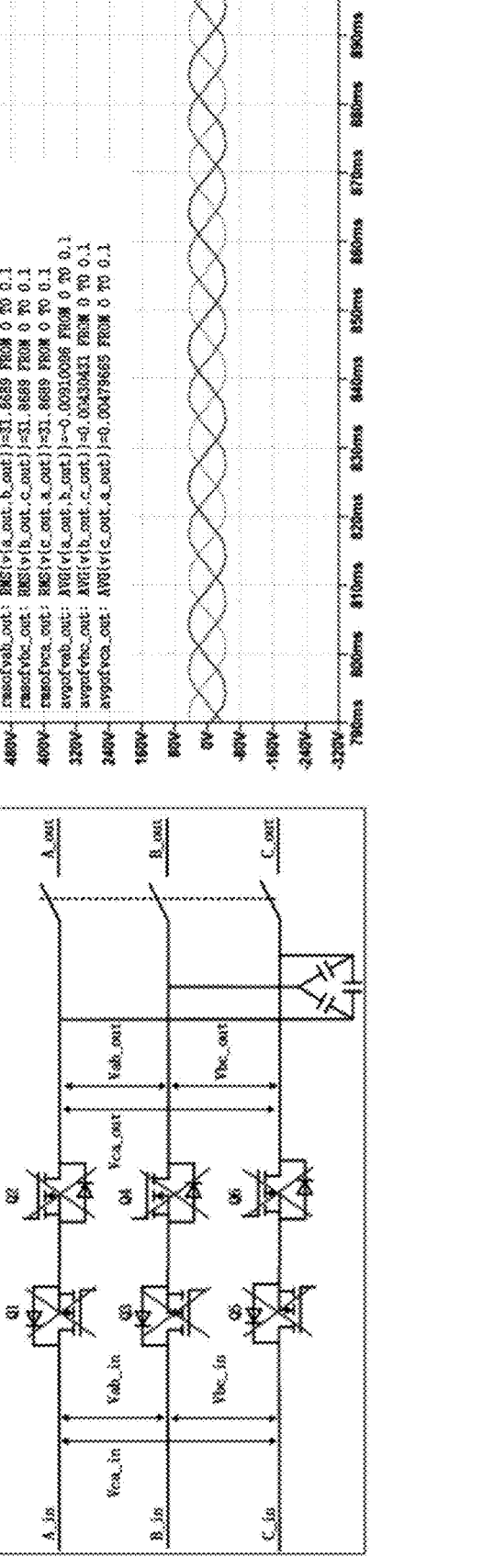
Figure 6:
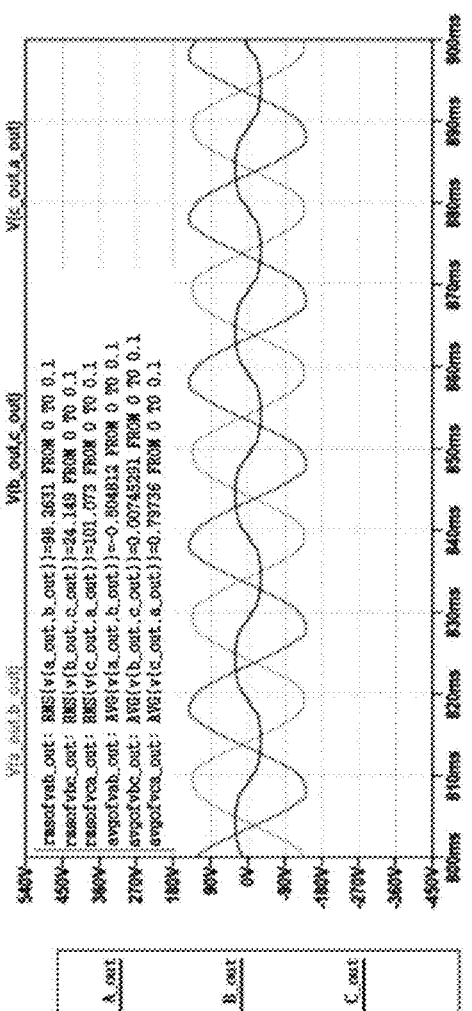
Figure 6:
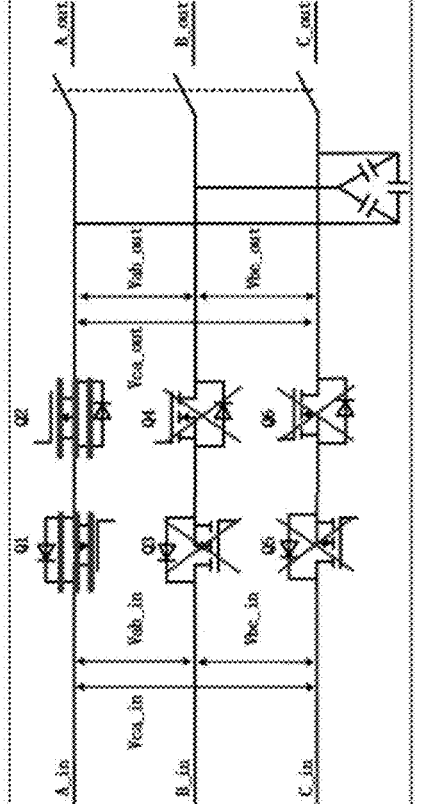

FIG. 4 illustrates a waveform in a typical power supply form supported by an alternating current power distribution protection system according to an embodiment of the present disclosure;

FIG. 5 illustrates an exemplary waveform in a normal state detected by a main-circuit electronic switch automatic detection unit 6 before a controllable mechanical isolating switch 9 is closed in an alternating current power distribution protection system according to an embodiment of the present disclosure; and FIG. 6 illustrates an exemplary waveform in an abnormal state detected by a main-circuit electronic switch automatic detection unit 6 before a controllable mechanical isolating switch 9 is closed in an alternating current power distribution protection system according to an embodiment of the present disclosure.

DETAILED DESCRIPTION

The present disclosure will be described in detail with reference to exemplary embodiments of the present disclosure. However, the present disclosure is not limited to the embodiments described here and may be implemented in many different forms. The described embodiments are merely used to make the present disclosure thorough and complete and comprehensively convey the concepts of the present disclosure to those skilled in the art. The features of each described embodiment may be combined or replaced with one another unless expressly excluded or excluded according to the context.

The technical solutions of the present disclosure are described in detail below with reference to the accompanying drawings.

Figure 1:
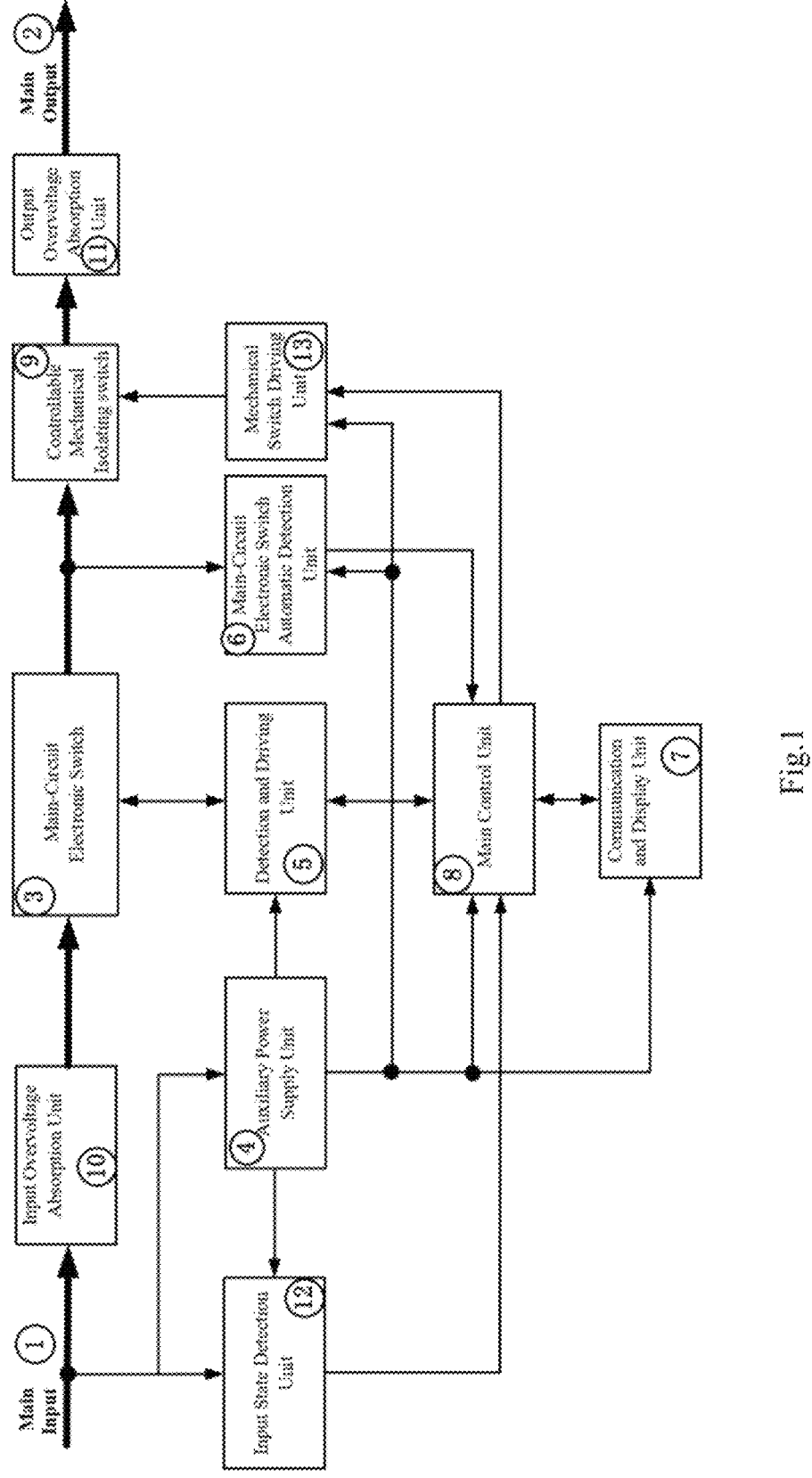
FIG. 1 illustrates a block diagram of an alternating current power distribution protection system according to an embodiment of the present disclosure.

FIG. 1 illustrates a block diagram of an alternating current power distribution protection system according to an embodiment of the present disclosure. With reference to FIG. 1, an alternating current power distribution protection system according to an embodiment of the present disclosure is composed of 13 units, including: a main input unit 1, an input overvoltage absorption unit 10, a main-circuit electronic switch unit 3, a controllable mechanical isolating switch 9, an output overvoltage absorption unit 11, and a main output unit 2 that are orderly connected in series in a main circuit; an auxiliary power supply unit 4 configured to provide working power supply for each unit in need of working power supply as shown in FIG. 1; a detection and driving unit 5 configured to drive an electronic switch of the main-circuit electronic switch unit 3 and detect a current on the main-circuit electronic switch unit 3 and the like; a main-circuit electronic switch automatic detection unit 6 configured to detect a state of the electronic switch of the main-circuit electronic switch unit 3; an input state detection unit 12 configured to detect a state of an input voltage; a main control unit 8 configured to comprehensive control; a communication and display unit 7 configured for communication and display interaction with the main control unit 8; and a mechanical switch driving unit 13 configured to drive an action of the controllable mechanical isolating switch 9.

The main input unit 1 includes a 3P wiring terminal for receiving an alternating current power input, which is capable of supporting a wiring form of three-phase live-wire alternating current input, a wiring form of single-phase (any 2P) alternating current input, a wiring form of standard three-phase alternating current input with phase-lost, and a wiring form of double live wire+N wire alternating current input.

The main output unit 2 includes 3P wiring terminals for outputting alternating current power, which are capable of correspondingly supporting the wiring form of three-phase live-wire alternating current input, the wiring form of single-phase (any 2P) alternating current input, the wiring form of standard three-phase alternating current input with phase-lost, and the wiring form of double live wire+N wire alternating current input, based on the alternating current power input received by the main input unit 1.

The electronic switch of the main-circuit electronic switch unit 3 may be a main-circuit power electronic switching device such as a metal-oxide-semiconductor field effect transistor (MOSFET)/insulated-gate bipolar transistor (IGBT).

The auxiliary power supply unit 4 is configured to provide working power supply for each unit in need of working power supply as shown in FIG. 1. For example, the auxiliary power supply unit 4 provides working power supply for the detection and driving unit 5, the main-circuit electronic switch automatic detection unit 6, the communication and display unit 7, the main control unit 8, the input state detection unit 12, and the mechanical switch driving unit 13.

The detection and driving unit 5 is configured to: generate a driving signal for driving the electronic switch of the main-circuit electronic switch unit 3 under the control of the main control unit 8; detect electrical parameter information of overload, overcurrent (in a short-circuit case), and leakage current failure of the main circuit by detecting the current on the electronic switch of the main-circuit electronic switch unit 3 and the like, generate corresponding protection information, and transmit the protection information to the main control unit 8.

Before the controllable mechanical isolating switch 9 is closed, the main-circuit electronic switch automatic detection unit 6 auto-detects a state of the electronic switch of the main-circuit electronic switch unit 3. When the state of the electronic switch of the main-circuit electronic switch unit 3 is normal, information of normal automatic detection is transmitted to the main control unit 8, and then the main control unit 8 transmits an instruction of closing the controllable mechanical isolating switch 9 to the mechanical switch driving unit 13. Thus, it can be avoided that the controllable mechanical isolating switch 9 is closed in a failure state of the main-circuit electronic switch. After receiving the instruction of closing the controllable mechanical isolating switch 9, the mechanical switch driving unit 13 drives the controllable mechanical isolating switch 9 to perform a closing action.

The communication and display unit 7 is configured to exchange electrical parameter and control information with the main control unit 8, input switching value information, and display failure information. The communication and display unit 7 may also be configured to exchange the electrical parameter and control information and the like (not shown) with other devices of an external power management device or system.

The main control unit 8 is configured to: receive switching value information about an input wiring form indicated by the communication and display unit 7 and detection result information from the input state detection unit 12, the detection and driving unit 5, and the main-circuit electronic switch automatic detection unit 6; process an electrical parameter; and based on an electrical parameter processing result and the switching value information, (1) determine the wiring form of the alternating current power input; (2) determine whether the main circuit has an overcurrent, overload or leakage current failure; and (3) complete automatic detection and protection logic processing of the controllable mechanical isolating switch 9. In a normal case, a driving signal for driving related switches is transmitted to the detection and driving unit 5 and the mechanical isolating switch driving unit 13. Meanwhile, the main control unit 8 exchanges information with the communication and display unit 7.

The controllable mechanical isolating switch 9 is reliably closed or disconnected under the control of the main control unit 8 at a speed lower than turned on or turned off of the power electronic switch of the main-circuit electronic switch unit 3, and has an independent breaking current capability.

The input overvoltage absorption unit 10 is configured to absorb residual energy of an upper-stage circuit after open-circuit protection of the main-circuit electronic switch unit 3 or the controllable mechanical isolating switch 9 or to absorb input surge energy when the controllable mechanical isolating switch 9 is closed.

The output overvoltage absorption unit 11 is configured to absorb residual energy of a lower-stage circuit after open-circuit protection of the main-circuit electronic switch unit 3 or the controllable mechanical isolating switch 9 or to absorb output surge energy when the controllable mechanical isolating switch 9 is closed.

The input state detection unit 12 is configured to detect the state of the input voltage, determine whether the state is overvoltage, undervoltage, or phase lost, and identify the wiring form of the input voltage.

Figure 2:
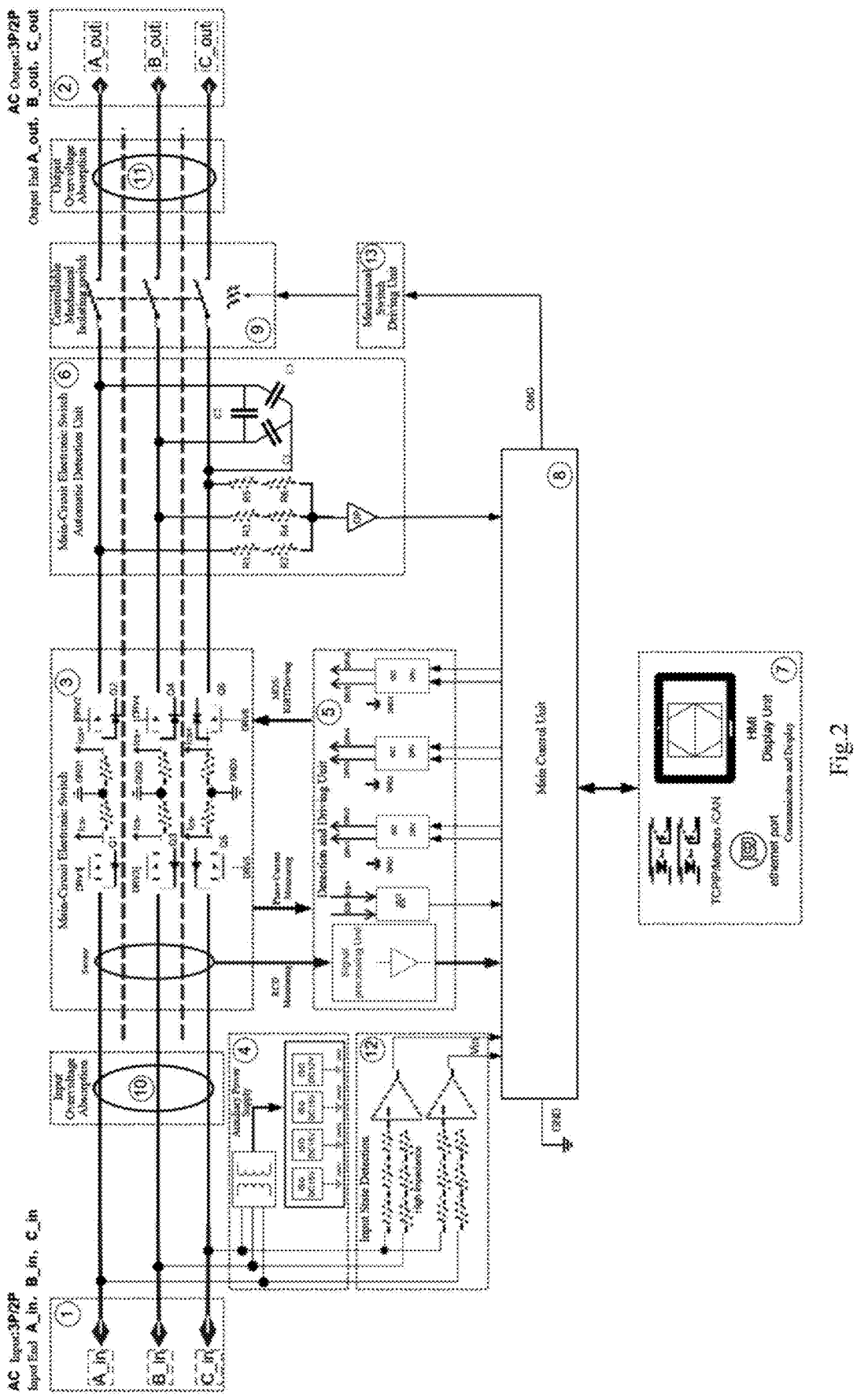
FIG. 2 illustrates an exemplary circuit diagram of each unit of an alternating current power distribution protection system according to an embodiment of the present disclosure.

FIG. 2 illustrates an exemplary circuit diagram of each unit of an alternating current power distribution protection system according to an embodiment of the present disclosure. With reference to FIG. 2, an example of a circuit implementation corresponding to functional units of the alternating current power distribution protection system according to the embodiment of the present disclosure in FIG. 1 is shown. The circuit implementation of the present disclosure is not limited to the example shown in FIG. 2. Within the cognitive scope of those of ordinary skilled in the art, it is apparent that the present disclosure has a plurality of circuit implementations that fall within the protection scope of the present disclosure.

In FIG. 2, the main input unit 1, the input overvoltage absorption unit 10, the main-circuit electronic switch unit 3, the controllable mechanical isolating switch 9, the output overvoltage absorption unit 11, and the main output unit 2 are orderly connected in series in the main circuit. Input ends of the auxiliary power supply unit 4 and the input state detection unit 12 are connected to the main input unit 1 separately to receive an input alternating current power distribution voltage. The detection and driving unit 5 is connected to the main-circuit electronic switch unit 3 and the main control unit 8. The detection and driving unit 5 is configured to detect the leakage current failure of the main circuit through a hall sensor, and detect overcurrent and overload failures through phase current monitoring. The detection and driving unit 5 is configured to transmit a driving signal to the main-circuit electronic switch unit 3 based on a control signal of the main control unit 8. The main-circuit electronic switch automatic detection unit 6 is configured to detect the electrical parameter of the main circuit between the main-circuit electronic switch unit 3 and the controllable mechanical isolating switch 9, and the main control unit 8 is configured to determine whether the state of the electronic switch of the main-circuit electronic switch unit 3 is normal based on the detection result of the electrical parameter from the main-circuit electronic switch automatic detection unit 6.

Figure 3:
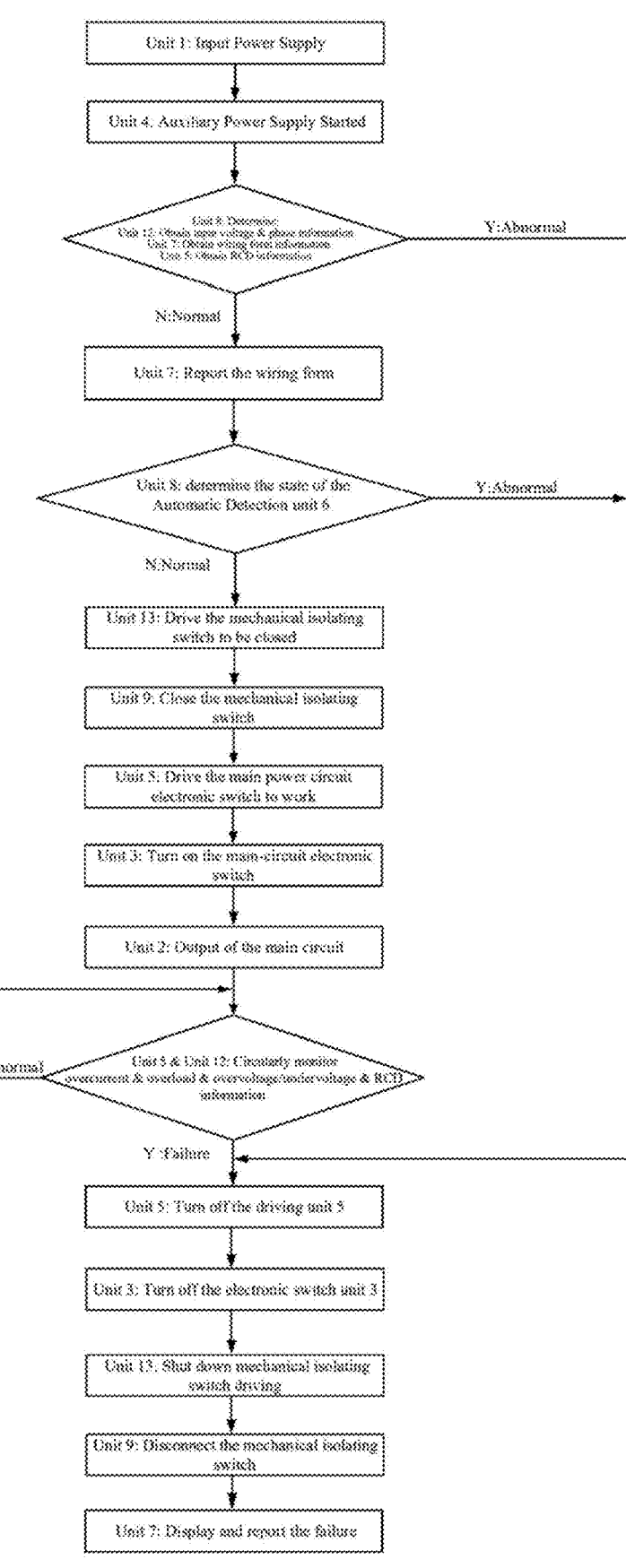
FIG. 3 illustrates a flowchart of a method for an alternating current power distribution protection system according to an embodiment of the present disclosure.

FIG. 3 illustrates a flowchart of a method for an alternating current power distribution protection system according to an embodiment of the present disclosure. With reference to FIG. 3, in an initial state, the electronic switch of the main-circuit electronic switch unit 3 is turned off and the controllable mechanical isolating switch 9 is in a disconnection state.

At step S310, an alternating current power distribution input is received via the main input unit 1.

At step S312, the auxiliary power supply unit 4 is started to provide working power supply for the detection and driving unit 5, the main-circuit electronic switch automatic detection unit 6, the communication and display unit 7, the main control unit 8, the input state detection unit 12, and the mechanical switch driving unit 13.

At step S314, the main control unit 8 determines whether the alternating current power input in a particular wiring form is normal or abnormal based on an electrical parameter detected by the input state detection unit 12 (e.g., input voltage amplitude, frequency, and phase information detected by the input state detection unit 12) and switching value information about an input form indicated by the communication and display unit 7. The main control unit 8 determines whether the main circuit is in an abnormal state of "leakage current" based on the electrical parameter detected by the detection and driving unit 5 (e.g., the leakage current information detected by the detection and driving unit 5).

When the determination result from step S314 is normal, the method proceeds to step S316. At step S316, the communication and display unit 7 reports the wiring form of the alternating current power input to an upper-stage device. The method then proceeds to step S318.

When the determination result from step S314 is abnormal, the method skips to step S332.

At step S318, the detection and driving unit 5 sends a turning on/turning off driving signal to the electronic switches (Q1-Q6 in FIG. 2) of the main-circuit electronic switch unit 3 under the control of the main control unit 8 (regardless of the states of Q1-Q6). At this time, the main control unit 8 determines whether each main electronic switch of Q1-Q6 is abnormal based on the electrical parameter detected by the main-circuit electronic switch automatic detection unit 6 (e.g., the periodic voltage information detected by the main-circuit electronic switch automatic detection unit 6).

When the determination result from step S318 is abnormal, the method skips to step S332.

When the determination result from step S318 is normal, the methods orderly proceeds to step S320, step S322, step S324, step S326, and step S328. At step S322, the mechanical switch driving unit 13 drives the controllable mechanical isolating switch 9 to be closed under the control of the main control unit 8. At step S324, the detection and driving unit 5 sends the turning on driving signal to the electronic switches (Q1-Q6 in FIG. 2) of the main-circuit electronic switch unit 3 under the control of the main control unit 8. At step S326, after receiving the turning on driving signal from the detection and driving unit 5, the electronic switches of the main-circuit electronic switch unit 3 are turned on. At step S328, the main output unit 2 outputs alternating current power distribution.

Next, the method proceeds to step S330. At step S330, the input state detection unit 12 continues to circularly detect the electrical parameter, e.g., the overvoltage/undervoltage information of the input voltage; the detection and driving unit 5 continues to circularly detect the electrical parameter, e.g., the leakage current information, overload information, and overcurrent information of the main circuit; and the main control unit 8 determines whether the main circuit has a failure state of overvoltage/undervoltage, leakage current, overload, and overcurrent based on the electrical parameters detected by the input state detection unit 12 and detected by the detection and driving unit 5.

When the determination result from step S330 is a failure, the method skips to step S332.

At step S332, the main control unit 8 sends the turning off driving signal to the detection and driving unit 5. Next, the method orderly proceeds to step S334, step S336, step S338, and step S340.

At step S334, the detection and driving unit 5 sends the turning off driving signal to the electronic switches (Q1-Q6 in FIG. 2) of the main-circuit electronic switch unit 3 such that the electronic switches of the main-circuit electronic switch unit 3 are turned off.

At step S336, the main control unit 8 sends the disconnecting driving signal to the mechanical switch driving unit 13.

At step S338, the mechanical switch driving unit 13 sends the disconnecting driving signal to the controllable mechanical isolating switch 9 such that the controllable mechanical isolating switch 9 is disconnected.

At step S340, the communication and display unit 7 reports failure information to the upper-stage device and display the failure information.

When the determination result from step S330 is normal, step S330 is performed circularly.

After the overcurrent, overload, and leakage current information is detected by the detection and driving unit 5 (leakage current detection of step S314 and leakage current, overload, and overcurrent detection of step S330), if an abnormal current reaches an instantaneous tripping level, wave blocking (disconnecting) processing is directly performed by the hardware of the detection and driving unit 5 such that switches of the main-circuit electronic switch unit 3 block wave, and meanwhile, the controllable mechanical isolating switch 9 is driven to be disconnected. Subsequently, alarm information is processed by the main control unit 8, and the failure information is reported by the communication and display unit 7 and the failure is indicated.

After the overcurrent, overload, and leakage current information is detected by the detection and driving unit 5 (leakage current detection of step S314 and leakage current, overload, and overcurrent detection of step S330), if the abnormal current does not reach the instantaneous tripping level, long time delaying or short time delaying logic processing is performed by the main control unit 8. If the overcurrent, overload, and leakage current are still removed when the long delayed time or the short delayed time expires, wave blocking processing is performed by the hardware of the detection and driving unit 5 such that the switches of the main-circuit electronic switch unit 3 block wave, and meanwhile, the controllable mechanical isolating switch 9 is driven to be disconnected. Subsequently, the alarm information is processed by the main control unit 8, and the failure information is reported by the communication and display unit 7 and the failure is indicated.

When the main control unit 8 determines the main circuit has the failure state of overvoltage/undervoltage based on the voltage of the alternating current power detected by the input state detection unit 12 at step S330, the electronic switch of the main-circuit electronic switch unit 3 is turned off by the detection and driving unit 5, and meanwhile, the main control unit 8 controls the controllable mechanical isolating switch 9 to be disconnected. Subsequently, the alarm information is processed by the main control unit 8, and the failure information is reported by the communication and display unit 7 and the failure is indicated.

FIG. 4 illustrates a waveform in a typical power supply form supported by an alternating current power distribution protection system according to an embodiment of the present disclosure.

In FIG. 1 and FIG. 2, the electrical parameters of the alternating current power distribution input of the main input unit 1 are detected by the input state detection unit 12. The electrical parameters are, for example, a voltage amplitude, a frequency, a phase, and the like. The information is transmitted together with the switching value information about the input form indicated by the communication and display unit 7 to the main control unit 8 for logic determination on the wiring form of the input, and whether the alternating current power input is overvoltage, undervoltage, phaselost, and the like is determined.

The main control unit 8 performs logic determination based on typical features of the 2P\3P power supply form that can be supported in the embodiments of the present disclosure. The determination result may be, for example, "abnormal alternating current power input in a particular wiring form" or "normal alternating current power input in a particular wiring form".

After the above determination, the waveform in the typical power supply form supported by the alternating current power distribution protection system according to the embodiment of the present disclosure shown in FIG. 4 can be identified. For example, FIG. 4(1) illustrates the waveform in the typical power supply form of standard 3 P input and 220 V phase voltage (i.e., the wiring form of three-phase live-wire alternating current input); FIG. 4(2) illustrates the waveform in the typical power supply form of 3 P input and 220 V phase voltage with phase A lost (i.e., the wiring form of standard three-phase alternating current input with phaselost); FIG. 4(3) illustrates the waveform in the typical power supply form of 2 P input (L to A, N to B, and no input to C) and 220 V phase voltage (i.e., the wiring form of single-phase alternating current input); and FIG. 4(4) illustrates the waveform in the typical power supply form of 3 P split phase (L1 to A, L2 to C, and N to B) and 120 V phase voltage (i.e., the wiring form of double live wire+N wire alternating current input).

FIG. 5 illustrates an exemplary waveform in a normal state detected by a main-circuit electronic switch automatic detection unit 6 before a controllable mechanical isolating switch 9 is closed in an alternating current power distribution protection system according to an embodiment of the present disclosure. FIG. 6 illustrates an exemplary waveform in an abnormal state detected by a main-circuit electronic switch automatic detection unit 6 before a controllable mechanical isolating switch 9 is closed in an alternating current power distribution protection system according to an embodiment of the present disclosure.

Referring back to FIG. 1 and FIG. 2, when the main input unit 1 starts to input power supply, the controllable mechanical isolating switch 9 is not closed. The detection and driving unit 5 sends the turning on/turning off driving signal to the electronic switches (Q1-Q6 in FIG. 2) of the main-circuit electronic switch unit 3 under the control of the main control unit 8 (regardless of the states of Q1-Q6). At this time, by sampling the voltages of C1, C2, and C3 by the main-circuit electronic switch automatic detection unit 6 and performing waveform and amplitude analysis, whether each switch (Q1-Q6 in FIG. 2) of the main-circuit electronic switch unit

3 is in the abnormal state may be determined. If there is no anomaly, the controllable mechanical isolating switch 9 gets ready to receive the closing driving signal and perform the closing action. If a certain switch of the main-circuit electronic switch unit 3 is in the abnormal state, regardless of any command executed, the closing/turning on driving signal needs to be in an invalid state, and the switch of the main-circuit electronic switch unit 3 remains in the disconnection state. A failure signal is fed back to an operator to indicate there is a failure, and after the abnormal failure is removed and the automatic detection result obtained by the main-circuit electronic switch automatic detection unit 6 and the main control unit 8 is normal, the controllable mechanical isolating switch 9 can receive the closing driving signal and perform the closing action.

FIG. 5 illustrates the voltage waveforms of C1, C2, and C3 sampled by the main-circuit electronic switch automatic detection unit 6 when the switches Q1, Q2, Q3, Q4, Q5, and Q6 of the main-circuit electronic switch unit 3 have no failure under the normal power supply input of standard 3P input and 220 V phase voltage from the main input unit 1. Before the controllable mechanical isolating switch 9 is closed, when the switches Q1, Q2, Q3, Q4, Q5, and Q6 of the main-circuit electronic switch unit 3 have no failure, Vca_out, Vab_out, and Vbc_out voltage waveforms are symmetrical with phase angles of 120° and are the same in amplitude.

FIG. 6 illustrates the voltage waveforms of C1, C2, and C3 sampled by the main-circuit electronic switch automatic detection unit 6 when the switches Q1, Q2, Q3, Q4, Q5, and Q6 of the main-circuit electronic switch unit 3 have failures under the normal power supply input of standard 3P input and 220 V phase voltage from the main input unit 1. Before the controllable mechanical isolating switch 9 is closed, the switches Q1 and Q2 of the main-circuit electronic switch unit 3 already have failures, Vca_out, Vab_out, and Vbc_out voltage waveforms are symmetrical but with significant differences in waveform amplitude at obvious positions.

The method for determining the failures of other branch switches of the main-circuit electronic switch unit 3 is the same as that shown in FIG. 6.

In this way, with the voltage waveforms of C1, C2, and C3 sampled by the main-circuit electronic switch automatic detection unit 6, the main control unit 8 may compare the periodic voltage magnitudes of the voltage waveforms to determine which switch of the main-circuit electronic switch unit 3 is abnormal or that all the electronic switches of the main-circuit electronic switch unit 3 are normal.

The alternating current power distribution protection system and the method thereof according to the embodiments of the present disclosure may be applied to an alternating current power distribution system including a solid-state circuit breaker and/or a mechanical isolating switch.

In the alternating current power distribution protection system and the method thereof according to the embodiments of the present disclosure, when the mechanical isolating switch closed when powering up is on load, whether the main-circuit electronic switch of the solid-state circuit breaker has a failure may be determined in advance.

In the alternating current power distribution protection system and the method thereof according to the embodiments of the present disclosure, when the mechanical isolating switch is closed when powering up with a load, the main-circuit electronic switch is in a good state, but the load is already in a short-circuit state, the detection and driving unit may completely turn off the main-circuit electronic switch after power up, thereby avoiding an electrical accident.

In the alternating current power distribution protection system and the method thereof according to the embodiments of the present disclosure, when a failure occurs before the mechanical isolating switch is closed, the operator may be informed of this failure. When a failure is detected, regardless of any command executed, the mechanical isolating switch is not allowed to perform the closing action, and the closing command can be received and the closing action can be performed after the failure is removed.

In the alternating current power distribution protection system and the method thereof according to the embodiments of the present disclosure, it is guaranteed that the main-circuit electronic switch is in no-failure state before powering up again each time, thereby guaranteeing safe and reliable use by a customer and avoiding other unpredictable electrical safety problems caused by failing to determine by the customer in use due to a failure of the circuit breaker.

In the alternating current power distribution protection system and the method thereof according to the embodiments of the present disclosure, the customer is allowed to safely and reliably use the solid-state circuit breaker to a larger extent, and meanwhile, upon detecting that the main-circuit electronic switch has a failure, the position of the failure and a preset number can be determined accurately. The difficulty level of removal of the failure by the maintenance personnel is greatly reduced; the repair time is greatly shortened; the repair efficiency and the experience of the customer are improved; and the intelligence requirements of the current market development and customers are met.

In the alternating current power distribution protection system and the method thereof according to the embodiments of the present disclosure, a 3P solid-state protection solution applicable to the alternating current power distribution system is implemented. The input power supply form is identified by input electrical characteristic detection, and whether the input is abnormal in wiring can be then determined. 2P applications or 3 P application scenarios in special forms can be normally supported, and a protection apparatus is allowed to be compatible with the 2 P/3 P application scenarios. Moreover, the input power supply form can be reported to an upper computer for energy management and alarm indication on the corresponding power supply form, and use by customers can be met to the utmost extent.

In the alternating current power distribution protection system and the method thereof according to the embodiments of the present disclosure, a solid-state circuit breaker design scheme applicable to an alternating current system is realized, which has the functions of overload, short circuit, and leakage current protection; a power electronic device such as MOSFET/IGBT is used as a main circuit breaking device (main-circuit electronic switch), and the protection time is at microsecond level. Meanwhile, automatic detection of the main-circuit electronic switch can be realized, preventing a safety risk induced by the mechanical isolating switch closing the main circuit in the failure state of the device. To meet the application requirements to the utmost extent, the solid-state circuit breaker design scheme according to the embodiments of the present disclosure can detect the input wiring form, allowing the input to be compatible with 2 P/3 P applications. For abnormal information such as an input wiring error or a device failure, the computer or the operator can be informed of immediately removing the failure by way of communication or state indication.

The entire hardware computing device or components thereof described in the present disclosure may be implemented by various suitable hardware means, including but not limited to FPGA, ASIC, SoC, discrete gate or transistor logic, discrete hardware components, or any combination thereof.

The blocks diagrams of the circuits, components, apparatuses, devices, and systems involved in the present disclosure are merely exemplary and not intended to require or imply that connection, arrangement, or configuration must be made as shown in the block diagrams. It will be recognized by those skilled in the art that such circuits, components, apparatuses, devices, and systems may be connected, arranged, or configured in any manner as long as the expected objective can be achieved.

It will be understood by those skilled in the art that the foregoing specific embodiments are merely exemplary and no-limiting. Various modifications, combinations, partial combinations, and replacements may be made to the embodiments of the present disclosure according to design requirements and other factors as long as they fall within the scope of the appended claims or equivalents thereof, i.e., pertain to the scope of the claims of the present disclosure.

The invention claimed is:

1. A power distribution protection system, comprising:
a main input unit configured to receive an alternating current power input;
a main-circuit electronic switch unit connected in series to the main input unit;
a controllable mechanical isolating switch connected in series to the main-circuit electronic switch unit;
a main output unit connected in series to the controllable mechanical isolating switch and configured to output alternating current power;
a main-circuit automatic detection unit configured to detect an electrical parameter of output from the main-circuit electronic switch unit in a disconnection state of the controllable mechanical isolating switch;
a main control unit configured to determine whether a state of a main-circuit electronic switch of the main-circuit electronic switch unit is normal based on electrical parameter information detected by the main-circuit automatic detection unit; and
an auxiliary power supply unit configured to provide working power supply for the main control unit and the main-circuit automatic detection unit based on the alternating current power input received by the main input unit,
wherein when the state of the main-circuit electronic switch of the main-circuit electronic switch unit is normal, the controllable mechanical isolating switch is closed under control of the main control unit and then the main-circuit electronic switch of the main-circuit electronic switch unit is turned on; and
when the state of the main-circuit electronic switch of the main-circuit electronic switch unit is abnormal, the controllable mechanical isolating switch remains disconnected under a control of the main control unit.

2. The power distribution protection system according to claim 1, further comprising:
an input state detection unit configured to detect an electrical parameter of the alternating current power input received by the main input unit,
wherein the main control unit is configured to: determine whether the alternating current power input is in a state of "abnormal alternating current power input in a particular wiring form" or in a state of "normal alternating current power input in a particular wiring form" based on electrical parameter information detected by the input state detection unit; and when the alternating current power input is in the state of "normal alternating current power input in a particular wiring form", further determine whether the state of the main-circuit electronic switch of the main-circuit electronic switch unit is normal based on the electrical parameter information detected by the main-circuit automatic detection unit;

wherein the auxiliary power supply unit is further configured to provide working power supply for the input state detection unit based on the alternating current power input received by the main input unit;

wherein when the alternating current power input is in the state of "abnormal alternating current power input in a particular wiring form", the main-circuit electronic switch of the main-circuit electronic switch unit is turned off, and the controllable mechanical isolating switch Mis disconnected under the control of the main control unit; and wherein when the alternating current power input is in the state of "normal alternating current power input in a particular wiring form" and when the state of the main-circuit electronic switch of the main-circuit electronic switch unit is normal, the controllable mechanical isolating switch is closed under the control of the main control unit and then the main-circuit electronic switch of the main-circuit electronic switch unit is turned on.

3. The power distribution protection system according to claim 1, wherein:

a detection and driving unit configured to detect a current output by the main-circuit electronic switch unit in a state where the main-circuit electronic switch of the main-circuit electronic switch unit is turned on and the controllable mechanical isolating switch is closed, wherein the auxiliary power supply unit is configured to provide working power supply for the detection and driving unit;

wherein the main control unit is configured to determine whether a main circuit is in an "overcurrent or overload or leakage current" state based on the current output detected by the detection and driving unit;

when the main circuit is determined to be in the "overcurrent or overload or leakage current" state, if the main control unit determines that an abnormal current detected by the detection and driving unit reaches an instantaneous tripping level, the main-circuit electronic switch of the main-circuit electronic switch unit is turned off by means of the detection and driving unit and meanwhile, the main control unit controls the controllable mechanical isolating switch to be disconnected;

when the main circuit is determined to be in the "overcurrent or overload or leakage current" state, if the main control unit determines that the abnormal current detected by the detection and driving unit does not reach the instantaneous tripping level, time is delayed by the main control unit; and if the main circuit is still in the "overcurrent or overload or leakage current" state when the time expires, the main-circuit electronic switch of the main-circuit electronic switch unit is turned off by means of the detection and driving unit and meanwhile, the main control unit controls the controllable mechanical isolating switch to be disconnected.

4. The power distribution protection system according to claim 3, further comprising:

an input state detection unit configured to detect a voltage of alternating current power received by the main input unit in the state where the main-circuit electronic switch of the main-circuit electronic switch unit is turned on and the controllable mechanical isolating switch is closed, wherein the main control unit is configured to determine whether the alternating current power is in an "overvoltage or undervoltage" state based on the voltage detected by the input state detection unit; and when the alternating current power is determined to be in the "overvoltage or undervoltage" state, the main-circuit electronic switch of the main-circuit electronic switch unit is turned off by means of the detection and driving unit and meanwhile, the main control unit controls the controllable mechanical isolating switch to be disconnected.

5. The power distribution protection system according to claim 2, wherein the particular wiring form of alternating current power comprises a wiring form of three-phase live-wire alternating current input, a wiring form of single-phase alternating current input, a wiring form of standard three-phase alternating current input with phase-lost, and a wiring form of double live wire+N wire alternating current input.

6. The power distribution protection system according to claim 1, wherein the electrical parameter information is at least one of a voltage amplitude, a frequency, and a phase.

7. The power distribution protection system according to claim 1, further comprising:

an input overvoltage absorption unit configured to absorb residual energy of an upper-stage circuit after the main-circuit electronic switch of the main-circuit electronic switch unit is turned off or the controllable mechanical isolating switch is disconnected or to absorb input surge energy when the controllable mechanical isolating switch is closed;

an output overvoltage absorption unit configured to absorb residual energy of a lower-stage circuit after the main-circuit electronic switch of the main-circuit electronic switch unit is turned off or the controllable mechanical isolating switch is disconnected or to absorb output surge energy when the controllable mechanical isolating switch is closed; and a communication and display unit configured to exchange electrical parameter and control information and input switching value information with the main control unit and display failure information.

8. The power distribution protection system according to claim 1, further comprising:

a detection and driving unit configured to detect a current output by the main-circuit electronic switch unit in a state where the main-circuit electronic switch of the main-circuit electronic switch unit is turned on and the controllable mechanical isolating switch is closed, wherein the auxiliary power supply unit is configured to provide working power supply for the detection and driving unit, wherein the main control unit is configured to determine whether a main circuit is in an "overcurrent or overload or leakage current" state based on the current detected by the detection and driving unit.

9. The power distribution protection system according to claim 1, further comprising:

a detection and driving unit, wherein when a main circuit is determined to be in an "overcurrent or overload or leakage current" state, if the main control unit determines that an abnormal current detected by the detection and driving unit does not reach an instantaneous tripping level, time is delayed by the main control unit; and if the main circuit is still in the "overcurrent or overload or leakage current" state when the time expires, the main-circuit electronic switch of the main-circuit electronic switch unit is turned off by means of the detection and driving unit and meanwhile, the main control unit controls the controllable mechanical isolating switch to be disconnected.

10. The power distribution protection system according to claim 1, further comprising:

an input state detection unit configured to detect an electrical parameter of the alternating current power input received by the main input unit; and an auxiliary power supply unit configured to provide working power supply for the input state detection unit based on the alternating current power input received by the main input unit, wherein when the alternating current power input is in the state of "abnormal alternating current power input in a particular wiring form", the main-circuit electronic switch of the main-circuit electronic switch unit is turned off, and the controllable mechanical isolating switch Mis disconnected under a control of the main control unit.

11. The power distribution protection system according to claim 1, further comprising:

an input state detection unit configured to detect an electrical parameter of the alternating current power input received by the main input unit; and when the alternating current power input is in a state of "normal alternating current power input in a particular wiring form" and when a state of the main-circuit electronic switch of the main-circuit electronic switch unit is normal, the controllable mechanical isolating switch is closed under the control of the main control unit and then the main-circuit electronic switch of the main-circuit electronic switch unit is turned on.

12. A method for a power distribution protection system, wherein the power distribution protection system comprises a main-circuit electronic switch unit and a controllable mechanical isolating switch; the method comprising:

detecting an electrical parameter of output from the main-circuit electronic switch unit in a disconnection state of the controllable mechanical isolating switch;

determining whether a state of a main-circuit electronic switch of the main-circuit electronic switch unit is normal based on electrical parameter information detected;

when the state of the main-circuit electronic switch of the main-circuit electronic switch unit is normal, closing the controllable mechanical isolating switch and then turning on the main-circuit electronic switch of the main-circuit electronic switch unit; and when the state of the main-circuit electronic switch of the main-circuit electronic switch unit is abnormal, allowing the controllable mechanical isolating switch to remain disconnected.

13. The method according to claim 12, wherein the electrical parameter information is first electrical parameter information, and further comprising:

detecting second electrical parameter information of an alternating current power input;

determining whether the alternating current power input is in a state of "abnormal alternating current power input in a particular wiring form" or in a state of "normal alternating current power input in a particular wiring form" based on the second electrical parameter information of the alternating current power input; and when the alternating current power input is in the state of "normal alternating current power input in a particular wiring form", further determining whether the state of the main-circuit electronic switch of the main-circuit electronic switch unit is normal based on the first electrical parameter information of the main-circuit electronic switch unit;

when the alternating current power input is in the state of "abnormal alternating current power input in a particular wiring form", turning off the main-circuit electronic switch of the main-circuit electronic switch unit, and disconnecting the controllable mechanical isolating switch; and when the alternating current power input is in the state of "normal alternating current power input in a particular wiring form" and when the state of the main-circuit electronic switch of the main-circuit electronic switch unit is normal, closing the controllable mechanical isolating switch and then turning on the main-circuit electronic switch of the main-circuit electronic switch unit.

14. The method according to claim 12, further comprising:

detecting a current output by the main-circuit electronic switch unit in a state where the main-circuit electronic switch of the main-circuit electronic switch unit is turned on and the controllable mechanical isolating switch is closed;

determining whether a main circuit is in an "overcurrent or overload or leakage current" state based on the current output by the main-circuit electronic switch unit;

when the main circuit is determined to be in the "overcurrent or overload or leakage current" state, if a detected abnormal current output by the main-circuit electronic switch unit is determined to reach an instantaneous tripping level, turning off the main-circuit electronic switch of the main-circuit electronic switch unit, and meanwhile, controlling the controllable mechanical isolating switch to be disconnected; and when the main circuit is determined to be in the "overcurrent or overload or leakage current" state, if the detected abnormal current output by the main-circuit electronic switch unit is determined to not reach the instantaneous tripping level, delaying time; and if the main circuit is still in the "overcurrent or overload or leakage current" state when the time expires, turning off the main-circuit electronic switch of the main-circuit electronic switch unit, and meanwhile, controlling the controllable mechanical isolating switch to be disconnected.

15. The method according to claim 14, further comprising:

detecting a voltage of alternating current power in a state where the main-circuit electronic switch of the main-circuit electronic switch unit is turned on and the controllable mechanical isolating switch is closed, wherein whether the alternating current power is in an "overvoltage or undervoltage" state is determined based on the voltage detected by an input state detection unit; and when the alternating current power is determined to be in the "overvoltage or undervoltage" state, turning off the main-circuit electronic switch of the main-circuit electronic switch unit, and meanwhile, controlling the controllable mechanical isolating switch to be disconnected.

16. The method according to claim 13, wherein a particular wiring form of alternating current power comprises a wiring form of three-phase live-wire alternating current input, a wiring form of single-phase alternating current input, a wiring form of standard three-phase alternating current input with phase-lost, and a wiring form of double live wire+N wire alternating current input.

17. The method according to claim 12, wherein the electrical parameter information is at least one of a voltage amplitude, a frequency, and a phase.

18. The method according to claim 12, further comprising:

absorbing residual energy of an upper-stage circuit after the main-circuit electronic switch of the main-circuit electronic switch unit is turned off or the controllable mechanical isolating switch is disconnected or absorbing input surge energy when the controllable mechanical isolating switch is closed;

absorbing residual energy of a lower-stage circuit after the main-circuit electronic switch of the main-circuit electronic switch unit is turned off or the controllable mechanical isolating switch is disconnected or absorbing output surge energy when the controllable mechanical isolating switch is closed; and exchanging electrical parameter and control information and input switching value information, and displaying failure information.

19. A power distribution device, comprising:

a main input unit configured to receive an alternating current power input;

a main-circuit electronic switch unit connected in series to the main input unit;

a controllable mechanical isolating switch connected in series to the main-circuit electronic switch unit;

a main output unit connected in series to the controllable mechanical isolating switch and configured to output alternating current power;

a main-circuit automatic detection unit configured to detect an electrical parameter of output from the main-circuit electronic switch unit in a disconnection state of the controllable mechanical isolating switch;

a main control unit configured to determine whether a state of a main-circuit electronic switch of the main-circuit electronic switch unit is normal based on electrical parameter information detected by the main-circuit automatic detection unit; and an auxiliary power supply unit configured to provide working power supply for the main control unit and the main-circuit automatic detection unit based on the alternating current power input received by the main input unit, wherein when the state of the main-circuit electronic switch of the main-circuit electronic switch unit is normal, the controllable mechanical isolating switch is closed under a control of the main control unit and then the main-circuit electronic switch of the main-circuit electronic switch unit is turned on; and when the state of the main-circuit electronic switch of the main-circuit electronic switch unit is abnormal, the controllable mechanical isolating switch remains disconnected under the control of the main control unit.

20. The power distribution device of claim 19, further comprising:

a detection and driving unit configured to detect a current output by the main-circuit electronic switch unit in a state where the main-circuit electronic switch of the main-circuit electronic switch unit is turned on and the controllable mechanical isolating switch is closed, wherein the auxiliary power supply unit is configured to provide working power supply for the detection and driving unit, wherein the main control unit is configured to determine whether a main circuit is in an "overcurrent or overload or leakage current" state based on the current detected by the detection and driving unit.

* * * * *